(12) United States Patent
Huang

(10) Patent No.: US 11,665,084 B2
(45) Date of Patent: May 30, 2023

(54) METHOD AND APPARATUS FOR DETERMINING FORWARDING PORT IN INFORMATION CENTERIC NETWORK

(71) Applicant: ZTE Corporation, Shenzhen (CN)

(72) Inventor: Guangping Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/294,541

(22) PCT Filed: Nov. 20, 2019

(86) PCT No.: PCT/CN2019/119651
§ 371 (c)(1),
(2) Date: May 17, 2021

(87) PCT Pub. No.: WO2020/103855
PCT Pub. Date: May 28, 2020

(65) Prior Publication Data
US 2021/0409305 A1 Dec. 30, 2021

(30) Foreign Application Priority Data

Nov. 20, 2018 (CN) .......................... 201811394520.X

(51) Int. Cl.
*H04L 45/121* (2022.01)
*H04L 43/0864* (2022.01)
*H04L 67/568* (2022.01)

(52) U.S. Cl.
CPC ........ *H04L 45/121* (2013.01); *H04L 43/0864* (2013.01); *H04L 67/568* (2022.05)

(58) Field of Classification Search
CPC ............. H04L 67/2842; H04L 43/0864; H04L 45/121
See application file for complete search history.

(56) References Cited

U.S. PATENT DOCUMENTS

| 7,778,265 B2* | 8/2010 | Evans | ..................... H04L 47/56 370/412 |
| 2009/0304014 A1* | 12/2009 | Evans | .................. H04L 47/623 370/412 |

(Continued)

FOREIGN PATENT DOCUMENTS

| CN | 104301305 A | 1/2015 |
| CN | 105577537 A | 5/2016 |
| CN | 105721536 A | 6/2016 |

OTHER PUBLICATIONS

Walid Benchaitia, Stability and Optimization of DNS-based Request Redirection in CDNs, Jan. 2016, ACM (Year: 2016).*

(Continued)

*Primary Examiner* — John A Follansbee
*Assistant Examiner* — Fadi Haj Said
(74) *Attorney, Agent, or Firm* — Vivacqua Crane, PLLC

(57) ABSTRACT

Disclosed is a method for determining a forwarding port in an information centric network. The method may include: determining an interest table item corresponding to a first request content in a pending interest table; creating a request queue corresponding to the first request content according to a port information stored in the interest table item; determining a maximum RTT corresponding to the first request content, and constructing a reward function according to the maximum RTT; constructing an optimization problem according to the reward function, the request queue and the maximum RTT; and performing a calculation on the optimization problem according to a Lyapunov function to obtain a Lyapunov drift, and determining a forwarding port corresponding to the first request content according to the Lyapunov drift.

4 Claims, 3 Drawing Sheets

(56) References Cited

U.S. PATENT DOCUMENTS

| | | | | |
|---|---|---|---|---|
| 2012/0155258 | A1* | 6/2012 | De Vleeschauwer | H04L 47/10 370/230 |
| 2012/0158957 | A1* | 6/2012 | Nakayama | H04L 43/0864 709/224 |
| 2014/0164584 | A1* | 6/2014 | Joe | H04L 67/06 709/223 |
| 2014/0181226 | A1* | 6/2014 | Xu | H04L 51/214 709/206 |
| 2016/0182680 | A1 | 6/2016 | Stapp et al. | |
| 2018/0278708 | A1* | 9/2018 | Ishihara | H04L 67/60 |

OTHER PUBLICATIONS

Lv, Jinyang et al. "DRL-based Forwarding Strategy in Named Data Networking" Proceedings of the 37th Chinese Control Conference, IEEE Xplore, Jul. 27, 2018 (Jul. 27, 2018). pp. 6493-6498. Wuhan, China.

Zhang. Wenzhi et al. "Research on Congestion Control of Content Centric Network" Information Technology, No. No. 7. Jul. 30, 2018 (Jul. 30, 2018). pp. 139-147 ISSN: 1009-2552. Shijiazhuang, China.

International Search Report and Written Opinion for the International Patent Application No. PCT/CN2019/119651 dated Feb. 1, 2020.

European Patent Office. Extenided European Search Report for EP Application No. 19886432.6, dated Sep. 1, 2021, pp. 1-10.

Benchaita et al., "Stability and Optimization of DNS-based Request Redirection in CDNs," Proceedings of the 17th International Conference on Distributed Computing and Networking (ICDCN '16). Association for Computing Machinery, pp. 1-10.

The State Intellectual Property Office of People's Republic of China. First Office Action for CN Application No. 201811394520.X and English translation, dated Jun. 20, 2022, pp. 1-15.

The State Intellectual Property Office of People's Republic of China First Search Report for CN Application No. 201811394520.X and English translation, dated Jun. 13, 2022, pp. 1-5.

* cited by examiner

METHOD AND APPARATUS FOR DETERMINING FORWARDING PORT IN INFORMATION CENTERIC NETWORK

CROSS-REFERENCE TO RELATED APPLICATIONS

This disclosure is a national stage filing under 35 U.S.C. § 371 of international disclosure number PCT/CN2019/119651, filed Nov. 20, 2019, which claims priority to Chinese patent disclosure No. 201811394520.X, filed Nov. 20, 2018. The contents of these disclosures are incorporated herein by reference in their entirety.

TECHNICAL FIELD

The present disclosure relates to the field of computer technology, and in particularly, to a method and apparatus for determining a forwarding port in an information centric network.

BACKGROUND

Transmission Control Protocol/Internet Protocol (TCP/IP) has been used as the core standard host protocol of Internet in the past because of simple hierarchical structure, good network performance and expansibility. With the rapid development of the Internet, the needs and backgrounds of users have changed a lot, resulting in the inconvenience of the traditional TCP/IP protocol architecture in terms of expansibility, mobility and security.

In order to address the problems existing in TCP/IP protocol architecture, in some cases, Information Centric Network (ICN) is proposed, and Named Data Networking (NDN) is the mainstream scheme in the ICN.

Routing and forwarding are the core parts of the network protocol, and excellent routing and forwarding policies are beneficial to improve the transmission performance of the network. In a Forwarding Information Base (FIB) of NDN, one information name may correspond to multiple output ports, which provides direct support for multicast transmission. However, if all ports are selected for forwarding, the transmission of redundant data will be undoubtedly increased, leading to network congestion. In the existing network protocols, the forwarding policy can only determine which ports are selected for forwarding according to the fault condition of the ports and the priority of the ports set artificially. Therefore, as can be seen in the network based on NDN architecture, by using the existing forwarding policy, it may easily occur that multiple ports are selected for forwarding in response to one request, which may easily cause network congestion.

Therefore, there is an urgent need for a NDN forwarding method that can dynamically adjust forwarding ports according to a change in a current network state, so as to make the selection of ports more adaptive during NDN forwarding, and avoid network congestion.

SUMMARY

The following technical schemes are described in some embodiments of the present disclosure:

According to a first aspect, a method for determining a forwarding port in an information centric network is described, which includes: determining an interest table item corresponding to a first request content in a pending interest table, wherein the interest table item is configured to store port information of a received interest packet corresponding to the first request content; creating a request queue corresponding to the first request content according to the port information stored in the interest table item; determining a maximum round-trip time (RTT) corresponding to the first request content, and constructing a reward function according to the maximum RTT; constructing an optimization problem according to the reward function, the request queue and the maximum RTT; and performing a calculation on the optimization problem according to a Lyapunov function to obtain a Lyapunov drift, and determining a forwarding port corresponding to the first request content according to the Lyapunov drift.

According to a second aspect, an apparatus for determining a forwarding port in an information centric network is described, which includes: an interest table item determining unit, configured to determine an interest table item corresponding to a first request content in a pending interest table; wherein the interest table item is configured to store port information of a received interest packet corresponding to the first request content; a queue creating unit, configured to create a request queue corresponding to the first request content according to the port information stored in the interest table item; a reward function constructing unit, configured to determine a maximum RTT corresponding to the first request content, and construct a reward function according to the maximum RTT; an optimization problem constructing unit, configured to construct an optimization problem according to the reward function, the request queue and the maximum RTT; and a forwarding port determining unit, configured to perform a calculation on the optimization problem according to a Lyapunov function to obtain a Lyapunov drift, and determine a forwarding port corresponding to the first request content according to the Lyapunov drift.

According to a third aspect, a non-transitory computer-readable storage medium is described, which stores computer-executable instructions, and the computer-executable instructions are used to execute the method described in any of the above aspects.

According to a fourth aspect, a computer program product is described, the computer program product includes a computer program stored on a non-transitory computer-readable storage medium, and the computer program includes program instructions, when the program instructions are executed by a computer, the computer is caused to execute the method described in any of the above aspects.

BRIEF DESCRIPTION OF DRAWINGS

In order to explain the technical schemes in the embodiments of the present disclosure or the existing technology, the drawings in the description of the embodiments or the existing technology will be introduced below. It is apparent that the drawings in the following description are some embodiments described in the present disclosure, and for those having ordinary skill in the art, other drawings may be obtained from these drawings without any creative labor.

DETAILED DESCRIPTION

In order to enable those of ordinary skill in the art to better understand the technical schemes in the present disclosure, some technical schemes in the embodiments of the present disclosure will be described in conjunction with the accompanying drawings in the embodiments of the present disclosure, apparently, the described embodiments are only a part of the embodiments of the present disclosure, rather than all the embodiments. Based on the embodiments in the present disclosure, all other embodiments obtained by those of ordinary skill in the art without creative work should fall within the protection scope of the present disclosure.

The technical schemes provided in the embodiments of the present disclosure will be described in detail below in combination with the drawings.

According to an embodiment of the present disclosure, a method for determining a forwarding port in an information centric network is provided to solve the problem of possible network congestion in an information centric network due to the fact that an existing forwarding policy is unable to determine a forwarding port according to a change in a current network state.

As an example of ICN, NDN has become the mainstream scheme of ICN by virtue of advanced concept, feasible scheme and substantial progress. In NDN, there are mainly two types of packets: interest packet and data packet, where the name of the content requested by a user is written in the interest packet, and the content itself requested by the user is written in the data packet.

Figures 1, 2:
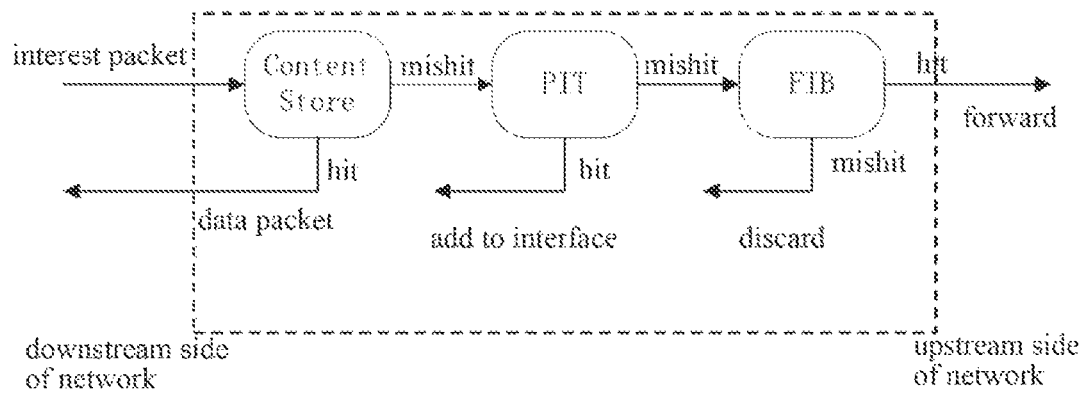
FIG. 1 is a schematic diagram of an interest packet processing flow based on a NDN according to an embodiment of the present disclosure.
FIG. 2 is a schematic diagram of a storage structure of a PIT in a NDN according to an embodiment of the present disclosure.

The processing flow of requests based on NDN is shown in FIG. 1. When a user needs to request for a content through NDN, the user may send an interest packet to a server. After the interest packet arrives at a NDN node, a content store (CS) table is queried in the NDN node to detect whether a data corresponding to the content requested by the interest packet has been cached locally. If it is detected that the data has been cached locally, the NDN node will forward the detected matching data packet from a transfer-in port of the interest packet and discard the interest packet.

If it is detected that the data has not been cached locally, the NDN node will continue to query a pending interest table (PIT). In the PIT, information of transfer-in ports and transfer-out ports corresponding to different request contents are recorded respectively according to the different request contents. For example, assuming that the NDN node receives five interest packets a, b, c, d and e sent by five users A, B, C, D and E, respectively, in which the contents requested by interest packets a, b and c are all 1, and the contents requested by interest packets d and e are all 2, then in the PIT, the request content and the port information of interest packets are recorded in the form shown in FIG. 2. As shown in FIG. 2, the port information of interest packets a, b and c is recorded in the table item of request content 1, and the port information of interest packets d and e is recorded in the table item of request content 2. The port information herein refers to information such as the port number of the forwarding port of the interest packet, so that the NDN node may return, by the same path, the queried data packet containing a user's request content to the user according to the port number. Then, after the NDN node receives the interest packet sent by the user and finds no data matching the interest packet in the CS table, the NDN node will further search the PIT for a table item corresponding to the request content according to the request content corresponding to the interest packet. If a table item corresponding to the request content exists in the interest packet in the PIT table, the port information of the interest packet will be added to the corresponding table item and the interest packet will be discarded; and if no table item corresponding to the request content is found in the interest packet, a new table item corresponding to the request content in the interest packet will be created in the PIT, and the NDN node will search a forwarding information base (FIB). The FIB is similar to the routing table in the traditional network, and provides the forwarding port information corresponding to the request content. If there is no table item matching with a request content in the FIB, the interest packet containing the request content will be discarded or a NACK packet will be returned; and if there is a table item matching with a request content in the FIB, the NDN node will select one or more ports from the forwarding ports provided by the FIB to forward the interest packet.

According to the above processing flow, when the NDN receives multiple interest packets for the same request content at the same time, the NDN node may forward one of the interest packets and record the transfer-in ports of all received interest packets in the PIT.

Figure 3:
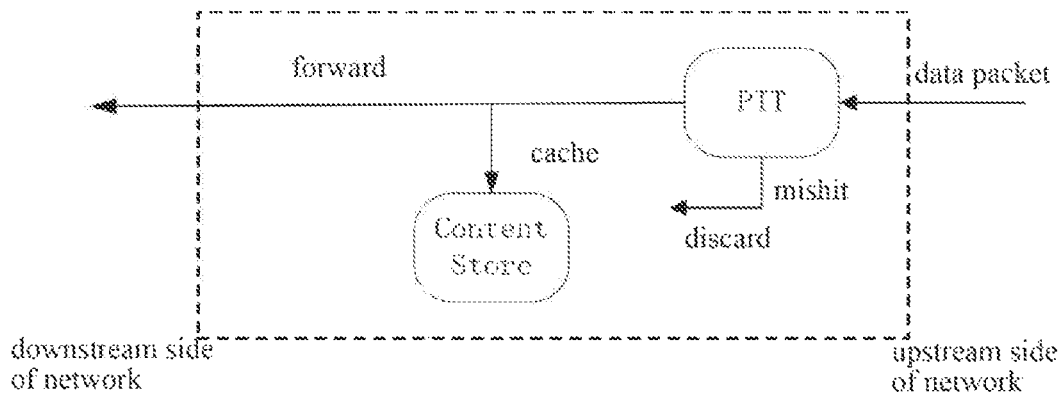
FIG. 3 is a schematic diagram of a data packet processing flow based on a NDN according to an embodiment of the present disclosure.

Compared with the interest packet processing, the data packet processing is completed in a simpler way. When the NDN node receives a data packet, the NDN node will search the PIT for a table item corresponding to the request content in the data packet, transfer the data packet from all the recorded transfer-out ports according to the port information recorded in the table item, and remove the table item from the PIT after all forwarding is completed. The processing flow of forwarding the data packet is shown in FIG. 3.

Figure 4:
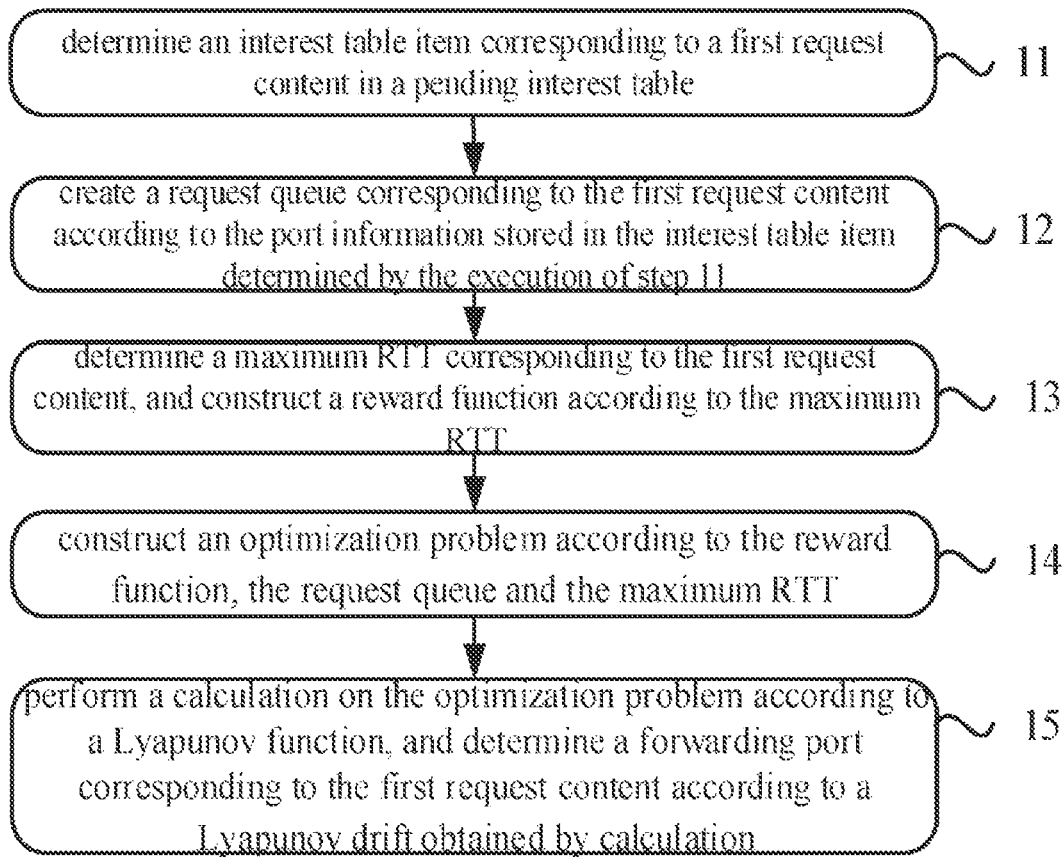
FIG. 4 is a flowchart of a method for determining a forwarding port in an information centric network according to an embodiment of the present disclosure.

Taking NDN in ICN as an example, according to the NDN forwarding flow introduced above, the method for determining a forwarding port according to this scheme is introduced in detail. The schematic diagram of flow of the method is shown in FIG. 4, which may include the following steps S11, S12, S13 and S14.

At step S11, an interest table item corresponding to a first request content in a pending interest table is determined; where the interest table item stores port information of a received interest packet corresponding to the first request content.

After the NDN node receives the interest packet sent by the user and determines that the request content corresponding to the interest packet is not cached locally by searching the CS table, the NDN node further searches the PIT table for an interest table item corresponding to the request content in the interest packet, and fills the port information of the interest packet in the table item when there exists the table item.

Meanwhile, when the NDN node needs to determine the forwarding port corresponding to the interest packet, it will determine the interest table item corresponding to the request content in the interest packet in the PIT table, so as to determine the forwarding port according to the relevant information recorded in the table item.

At step S12, a request queue corresponding to the first request content is created according to the port information stored in the interest table item determined by step 11. As can be seen from the previous introduction, in the PIT, the port information of all interest packets corresponding to each request content is stored in one interest table item. When the NDN node needs to determine a forwarding port of an interest packet corresponding to a request content, it will first extract the port information recorded in the interest table item corresponding to the request content from the PIT, and create a request queue according to the port information.

At step S13, a maximum Round-Trip Time (RTT) corresponding to the first request content is determined, and a reward function is built according to the maximum RTT. Due to the different importance of different request contents, the maximum time delay that users can tolerate for different request contents is also different. In order to make the services provided by NDN more in line with the needs of users, in one embodiment, the NDN may set different maximum RTT for different request contents. Then, the NDN node may set different timers for different request contents according to the maximum RTT. The timer starts timing from the time the NDN receives the interest packet. In response to not receiving the corresponding data packet return by the NDN after the timer exceeds the maximum RTT, the NDN node will discard the interest packet and delete the interest table item corresponding to the request content contained in the interest packet in the PIT table, thus avoiding the occupation of network processing resources by timeout requests.

Further, when the NDN node needs to determine the forwarding port corresponding to a request content, it may determine a maximum RTT preset for the request content, and construct the reward function according to the following formula [1]:

$$r_c(t,f) = \beta_c(RTT_{c,max} - \overline{rtt_c(t,f)}) \quad [1]$$

where $RTT_{c,max}$ denotes the maximum RTT corresponding to the first request content, $\overline{rtt_c(t,f)}$ denotes an average RTT corresponding to the first request content within a period of t, and $\beta_c$ denotes a weight factor preset for the first request content, which may also be preset according to the importance of the request content.

At step S14, an optimization problem is built according to the reward function, the request queue and the maximum RTT.

It should be noted that Lyapunov drift theory is a mathematical tool used to prove the stability of queue system and design stability control algorithm, and the basic idea is to determine the stability of the system and the speed of tending to stability directly through Lyapunov function and function change rate function. In 1992, the Lyapunov drift theory was designed as a general algorithm to control the stability of multi-hop data wireless networks, and then the concept of maximum weighted matching was put forward. Since then, the Lyapunov drift theory has been applied to the field of dynamic control of queue networks and extended to Lyapunov optimization theory. In the present disclosure, the forwarding port with the minimum RTT selected by the NDN node may be regarded as the stable state of the communication system, and then the optimal delay performance of the system can be realized by using the Lyapunov drift theory and the Lyapunov optimization theory, so as to determine the forwarding port according to the results. Therefore, during determining the forwarding port of NDN based on Lyapunov method, an optimization problem may be built according to the current network conditions, and then solved by Lyapunov method to determine the forwarding port.

In the embodiments of the present disclosure, the optimization problem may be built with a target of maximizing a value of the reward function obtained by the step S13 and constraints of the request queue built by the step S12 and the maximum RTT. According to formula [1], the value of the reward function is related to the RTT within the period of t and the maximum RTT, that is, the shorter the RTT within the period of t, the larger the value of the reward function, and the shorter the RTT, the better the user experience. Therefore, in the embodiments of the present disclosure, the maximization of the value of the reward function may be taken as the target during constructing the optimization problem.

In the embodiments of the present disclosure, the optimization problem may be built according to the following formula [2]:

Maximize: $\bar{r}$ subject to: 1) $\overline{Q} \leq ITEM_{max}$

2) $\overline{Timer_c} \leq RTT_{c,max}(\forall_c=1,2,\ldots,C)$

3) $\overline{cap_f} \leq CAP_{max}(\forall f=1,2,\ldots,F)$

4) $f(t) \in \{1,2,\ldots,F\}$; [2]

where Maximize: $\bar{r}$ denotes the target of maximizing the value of the reward function, $\overline{Q}$ denotes a length of the request queue, $ITEM_{max}$ denotes a maximum allowable length of the request queue, then $\overline{Q} \leq ITEM_{max}$ denotes a constraint that the length of the request queue does not exceed the maximum allowable length of the request queue; $\overline{Timer_c}$ denotes the average RTT, $RTT_{c,max}$ denotes the maximum RTT corresponding to the first request content, then $\overline{Timer_c} \leq RTT_{c,max}(\forall c=1, 2, \ldots, C)$ denotes a constraint that the average RTT does not exceed the maximum RTT; $\overline{cap_f}$ denotes a link capacity, with the unit of bit, $CAP_{max}$ ($\forall f=1, 2, \ldots, F$) denotes a maximum link capacity, then $\overline{cap_f} \leq CAP_{max}$ ($\forall f=1, 2, \ldots F$) denotes a constraint that the link capacity does not exceed the maximum link capacity; f(t) denotes forwarding ports to be selected and $f(t) \in \{1, 2 \ldots, F\}$ denotes a range of the forwarding ports to be selected.

Q(t)=Q(t=1)+a(t=1)−b(t=1) is satisfied, where Q(t) denotes the request queue at time t, Q(t−1) denotes the request queue at time t−1, a(t−1) denotes the interest packet received at time t−1, and b(t−1) denotes the data packet received at time t−1. As can be seen from FIG. 1 and FIG. 2, the received interest packets will lead to the increase of the request queue, while the received data packets will lead to the decrease of the request queue, so a(t−1)−b(t−1) may be used to denote the change of the request queue at time t−1.

$Timer_c(t)=Timer_c(t-1)+1$ is satisfied, where Timer (t) denotes the RTT at time t, and $Timer_c(t-1)$ denotes the RTT at time t−1.

In the above constraints, $$cap_f(t) = cap_f(t-1) - \sum_c [b_c(t-1,f) \cdot L_c] + \sum_c [b_c(t-1,f)' \cdot L_c]$$

is satisfied, where $b_c(t-1, f)$ denotes the data packet transferred from the NDN node at t−1, and $b_c(t-1, f)'$ denotes the data packet arrived at the NDN node at time t−1. As can be seen from FIG. 2, after the data packet arrives at the NDN node and the transfer-in port corresponding to the data packet is queried, the NDN node may return the data packet to the user according to the port. Due to the small data volume in the interest packet, compared with the data volume contained in the data packet, the interest packets received by the NDN node may be ignored during determining the link capacity of the NDN node. Therefore, within a certain period of time, the link capacity of the NDN node is equal to the link capacity in a previous period plus the incoming data packets in this period and minus the outgoing data packets in this period.

At step S15, the optimization problem built in step S14 is calculated according to the Lyapunov function to obtain a Lyapunov drift, and a forwarding port corresponding to the first request content is determined according to the Lyapunov drift obtained by calculation. It should be noted that, during calculating the optimization problem using the Lyapunov function, constraints in the optimization problem may need to be transformed into standard queues available in the Lyapunov function. Therefore, in step S15, before using the Lyapunov function, the constraints in the optimization problem obtained in step S14 may need to be transformed according to the standard queue form. In an embodiment, the constraints may be transformed into standard queues in the Lyapunov function according to the following formula [3].

$$U(t+1)=\max[U(t)+Q(t)-\text{ITEM}_{max},0]$$

$$Z_c(t+1)=\max[Z_c(t)+\text{Timer}_c(t)-RTT_{c,max},0]$$

$$H_f(t+1)=\max[H_f(t)+cap_f(t)-CAP_{max},0] \quad [3]$$

According to Lyapunov optimization theory, when $U(t)$, $Z_c(t)$ and $H_f(t)$ in the above formula [3] are all stable average rates, the inequality constraint obtained by the execution of step 14 holds.

Assuming that $\Theta(t)=[U(t), Z(t), H(t)]$, the Lyapunov function may be defined as follows [4]:

$$L(\Theta(t)) \triangleq \frac{1}{2}U(t)^2 + \frac{1}{2}\sum_c Z_c(t)^2 + \frac{1}{2}\sum_f H_f(t)^2 \quad [4]$$

The Lyapunov drift is defined according to the following formula [5]:

$$\Delta(\Theta(t)) \stackrel{\wedge}{=} E\{L(\Theta(t+1))-L(\Theta(t))|\Theta(t)\} \quad [5]$$

Then, after the Lyapunov drift is calculated, the selectable ports may be determined according to the following formula [6]:

$$\text{Minimize:}\Delta(\Theta(t))-V \cdot E\{r(t,f)|\Theta(t)\} \quad [6]$$

According to the above formula [6], by enumerating forwarding ports corresponding to the first request content, a forwarding interface that can minimize the value of formula [6] is determined, and the forwarding interface is taken as a forwarding port corresponding to the first request content, and then the interest packet containing the first request content can be forwarded through the forwarding port.

According to the method for determining a forwarding port in an information centric network provided by the present disclosure, during determining the forwarding port, an interest table item corresponding to a first request content is determined in a pending interest table to create a request queue corresponding to the first request content according to a port information stored in the interest table item; a maximum RTT corresponding to the first request content is determined, and a reward function is built according to the maximum RTT; an optimization problem is built according to the reward function, the request queue and the maximum RTT; and the optimization problem is calculated through a Lyapunov function to obtain a Lyapunov drift, and a forwarding port corresponding to the first request content is determined according to the Lyapunov drift. According to the method for determining a forwarding port, the reward function and Lyapunov method are introduced in the process of determining forwarding ports, so that the forwarding port with the shortest RTT can be determined from forwarding ports to be selected, and the problem of network congestion caused by improper selection of forwarding ports can be avoided to a great extent.

Figure 5:
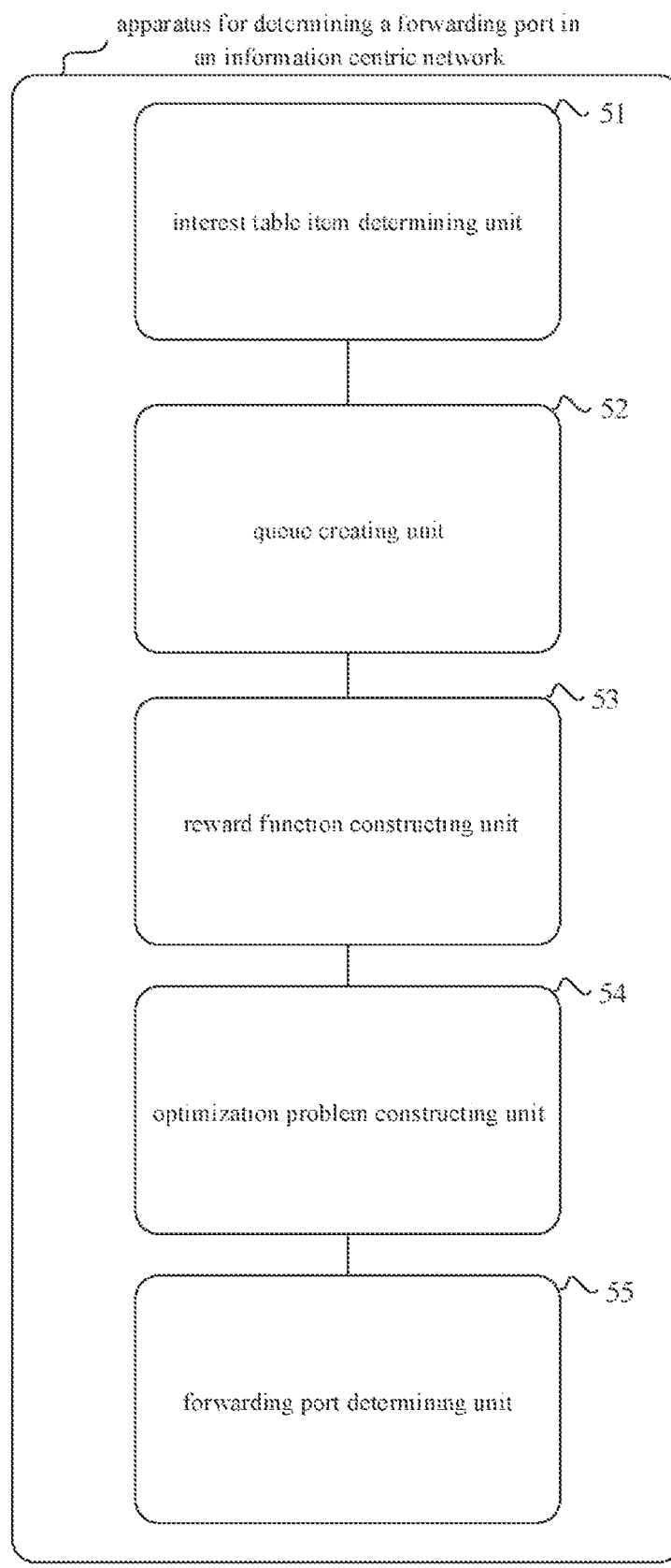
FIG. 5 is a schematic structure diagram of an apparatus for determining a forwarding port in an information centric network according to an embodiment of the present disclosure.

In addition, according to an embodiment of the present disclosure, an apparatus for determining a forwarding port in an information centric network is further provided to solve the problem of possible network congestion in an information centric network due to the fact that an existing forwarding policy is unable to determine a forwarding port according to a change in a current network state. The structure diagram of the apparatus is shown in FIG. 5, including: an interest table item determining unit 51, a queue creating unit 52, a reward function constructing unit 53, an optimization problem constructing unit 54 and a forwarding port determining unit 55.

The interest table item determining unit 51 is configured to determine an interest table item corresponding to a first request content in a pending interest table, where the interest table item stores port information of a received interest packet corresponding to the first request content. The queue creating unit 52 is configured to create a request queue corresponding to the first request content according to the port information stored in the interest table item. The reward function constructing unit 53 is configured to determine a maximum RTT corresponding to the first request content, and construct a reward function according to the maximum RTT. The optimization problem constructing unit 54 is configured to construct an optimization problem according to the reward function, the request queue and the maximum RTT. The forwarding port determining unit 55 is configured to perform a calculation on the optimization problem according to a Lyapunov function to obtain a Lyapunov drift, and determine a forwarding port corresponding to the first request content according to the Lyapunov drift.

In an embodiment, the reward function constructing unit 53 is configured to construct the reward function according to the maximum RTT and based on the following formula:

$$r_c(t,f)=\beta_c(RTT_{c,max}-\overline{rtt_c(t,f)});$$

where $RTT_{c,max}$ denotes the maximum RTT corresponding to the first request content, $\overline{rtt_c(t,f)}$ denotes an average RTT corresponding to the first request content within a period of t, and $\beta_c$ denotes a weight factor preset for the first request content.

In an embodiment, the optimization problem constructing unit 54 is configured to construct an optimization problem with a target of maximizing a value of the reward function and constraints of the request queue and the maximum RTT according to the following formula:

Maximize:$\bar{r}$ subject to:1)$\overline{Q} \leq \text{ITEM}_{max}$

2)$\overline{\text{Timer}_c} \leq RTT_{c,max}(\forall_c=1,2,\ldots,C)$

3)$\overline{cap_f} \leq CAP_{max}(\forall f=1,2,\ldots,F)$

4)$f(t) \in \{1,2,\ldots,F\};$ where Maximize: $\bar{r}$ denotes the target of maximizing the value of the reward function, $\bar{Q}$ denotes a length of the request queue, $ITEM_{max}$ denotes a maximum allowable length of the request queue, then $\bar{Q} \leq ITEM_{max}$ denotes a constraint that the length of the request queue does not exceed the maximum allowable length of the request queue; $\overline{Timer_c}$ denotes the average RTT, $RTT_{c,max}$ denotes the maximum RTT corresponding to the first request content, then $\overline{Timer_c} \leq RTT_{c,max}(\forall c=1, 2, \ldots, C)$ denotes a constraint that the average RTT does not exceed the maximum RTT; $\overline{cap_f}$ denotes a link capacity, $CAP_{max}(\forall f=1, 2, \ldots, F)$ denotes a maximum link capacity, then $\overline{cap_f} \leq CAP_{max} (\forall f=1, 2, \ldots F)$ denotes a constraint that the link capacity does not exceed the maximum link capacity; f(t) denotes forwarding ports to be selected and $f(t) \in \{1, 2 \ldots, F\}$ denotes a range of the forwarding ports to be selected.

In an embodiment, the forwarding port determining unit 55 is configured to transform the constraints in the optimization problem into virtualized queues according to the following formula:

$$U(t+1) = \max[U(t) + Q(t) - ITEM_{max}, 0]$$

$$Z_c(t+1) = \max[Z_c(t) + Timer_c(t) - RTT_{c,max}, 0]$$

$$H_f(t+1) = \max[H_f(t) + cap_f(t) - CAP_{max}, 0] \quad [3]$$

construct the Lyapunov function according to the following formula:

$$L(\Theta(t)) \triangleq \frac{1}{2}U(t)^2 + \frac{1}{2}\sum_c Z_c(t)^2 + \frac{1}{2}\sum_f H_f(t)^2;$$

where $L(\Theta(t))$ denotes a Lyapunov function of $\Theta(t)$, $\Theta(t)$ denotes the number of requests received at time t, and $\Theta(t) = [U(t), Z(t), H(t)]$; and perform a calculation on the Liapunov drift according to the following formula:

$$\Delta(\Theta(t)) \stackrel{\triangle}{=} E\{L(\Theta(t+1)) - L(\Theta(t)) | \Theta(t)\};$$

where $\Delta(\Theta(t))$ denotes a Lyapunov drift of $\Theta(t)$.

According to the method for determining a forwarding port in an information centric network provided by the present disclosure, during determining the forwarding port, an interest table item corresponding to a first request content is determined in a pending interest table to create a request queue corresponding to the first request content according to a port information stored in the interest table item; a maximum RTT corresponding to the first request content is determined, and a reward function is built according to the maximum RTT; an optimization problem is built according to the reward function, the request queue and the maximum RTT; and the optimization problem is calculated through a Lyapunov function to obtain a Lyapunov drift, and a forwarding port corresponding to the first request content is determined according to the Lyapunov drift. According to the method for determining a forwarding port, the reward function and Lyapunov method are introduced in the process of determining forwarding ports, so that the forwarding port with the shortest RTT can be determined from forwarding ports to be selected, and the problem of network congestion caused by improper selection of forwarding ports can be avoided to a great extent.

It should be noted that in this paper, the terms "including", "containing" or any other variations are intended to cover non-exclusive inclusion, so that a process, method, article or apparatus including a series of elements includes not only those elements, but also other elements not explicitly listed, or elements inherent to such process, method, article or apparatus. Without further restrictions, an element defined by the sentence "including one . . . " does not exclude the existence of other identical elements in the process, method, article or apparatus including the element.

According to an embodiment of the present disclosure, a non-transitory (nonvolatile) computer storage medium storing computer executable instructions is further provided, where the computer executable instructions may execute the method in any of the above method embodiments.

According to an embodiment of the present disclosure, a computer program product is further provided, including a computer program stored on a non-transitory computer readable storage medium, where the computer program includes program instructions, which, in response to being executed by a computer, cause the computer to execute the method in any of the above method embodiments.

Through the description of the above embodiments, those of ordinary skill in the art can understand that the above-mentioned methods can be executed by means of software plus a necessary general hardware platform, and certainly can also be executed by hardware, but the former is a better embodiment in many cases. Based on this understanding, the technical scheme of the present disclosure or the part that contributes to the existing technology can be embodied in the form of a software product, the computer software product is stored in a storage medium (such as ROM/RAM, magnetic disk, CD-ROM), includes several instructions to make a terminal device (which can be a mobile phone, a computer, a server, an air conditioner, or a network device, etc.) execute the method described in each embodiment of the present disclosure.

Some embodiments of the present disclosure are described above with reference to the accompanying drawings, however, the present disclosure is not limited to the above-mentioned embodiments, and the above-mentioned embodiments are only illustrative and not restrictive. Under the teachings of the present disclosure, those of ordinary skill in the art can make many modifications without departing from the purpose of the present disclosure and the protection scope of the claims, all of which fall within the protection scope of the present disclosure.

The invention claimed is:

1. A method for determining a forwarding port in Named Data Networking, comprising:
   determining an interest table item corresponding to a first request content in a pending interest table, wherein the interest table item is configured to store port information of a received interest packet corresponding to the first request content;
   creating a request queue corresponding to the first request content according to the port information stored in the interest table item;
   determining a maximum round-trip time (RTT) corresponding to the first request content, the maximum round-trip time (RTT) corresponding to the first request content being preset for the first request content, and constructing a reward function according to the maximum RTT;
   constructing an optimization problem according to the reward function, the request queue and the maximum RTT; and
   performing a calculation on the optimization problem according to a Lyapunov function to obtain a Lyapunov drift, and determining a forwarding port corresponding to the first request content according to the Lyapunov drift;

wherein constructing a reward function according to the maximum RTT comprises:

constructing the reward function according to the maximum RTT and based on the following formula:

$$r_c(t,f)=\beta_c(RTT_{c,max}-rtt_c(t,f));$$

where $RTT_{c,max}$ denotes the maximum RTT corresponding to the first request content, $rtt_c(t,f)$ denotes an average RTT corresponding to the first request content within a period of t, and $\beta_c$ denotes a weight factor preset for the first request content; and wherein constructing an optimization problem according to the reward function, the request queue and the maximum RTT comprises:

constructing an optimization problem with a target of maximizing a value of the reward function and a constraint of the request queue and the maximum RTT according to the following formula:

Maximize: $\bar{r}$

Subject to: 1) $\bar{Q} \leq ITEM_{max}$

2) $\overline{Timer_c} \leq RTT_{c,max}(\forall_c=1,2,\ldots,C)$

3) $\overline{cap_f} \leq CAP_{max}(\forall f=1,2,\ldots,F)$

4) $f(t) \in \{1,2,\ldots,F\}$ where Maximize: $\bar{r}$ denotes the target of maximizing the value of the reward function, $\bar{Q}$ denotes a length of the request queue, $ITEM_{max}$ denotes a maximum allowable length of the request queue, then $\bar{Q} \leq ITEM_{max}$ denotes a constraint that the length of the request queue does not exceed the maximum allowable length of the request queue;

$\overline{Timer_c}$ denotes the average RTT, $RTT_{c,max}$ denotes the maximum RTT corresponding to the first request content, then $\overline{Timer_c} \leq RTT_{c,max}(\forall c=1, 2, \ldots, C)$ denotes a constraint that the average RTT does not exceed the maximum RTT; C denotes a total amount of contents arrived;

$\overline{cap_f}$ denotes a link capacity, $CAP_{max}(\forall f=1, 2, \ldots, F)$ denotes a maximum link capacity, then $\overline{cap_f} \leq CAP_{max}$ ($\forall f=1, 2, \ldots F$) denotes a constraint that the link capacity does not exceed the maximum link capacity;

f(t) denotes forwarding ports to be selected and $f(t) \in \{1, 2 \ldots, F\}$ denotes a range of the forwarding port to be selected; F denotes a total amount of ports;

and wherein performing a calculation on the optimization problem according to a Lyapunov function to obtain a Lyapunov drift comprises:

transforming the constraint in the optimization problem into a virtualized queue accordi ng to the following formula:

$$U(t+1)=\max[U(t)+Q(t)-ITEM_{max},0]$$

$$Z_c(t+1)=\max[Z_c(t)+Timer_c(t)-RTT_{c,max},0]$$

$$H_f(t+1)=\max[H_f(t)+cap_f(t)-CAP_{max},0];$$

constructing the Lyapunov function according to the following formula:

$$L(\Theta(t)) \triangleq \frac{1}{2}U(t)^2 + \frac{1}{2}\sum_c Z_c(t)^2 + \frac{1}{2}\sum_f H_f(t)^2;$$

where $L(\Theta(t))$ denotes a Lyapunov function of $\Theta(t)$, $\Theta(t)$ denotes the number of requests received at time t, and $\Theta(t)=[U(t), Z(t), H(t)]$; and calculating the Liapunov drift according to the following formula:

$$\Delta(\Theta(t)) \stackrel{\wedge}{=} E\{L(\Theta(t+1))-L(\Theta(t))|\Theta(t)\};$$

where $\Delta(\Theta(t))$ denotes a Lyapunov drift of $\Theta(t)$.

2. The method of claim 1, wherein determining a forwarding port corresponding to the first request content according to the Lyapunov drift comprises:

determining the forwarding port corresponding to the first request content according to the Lyapunov drift and based on the following formula:

Minimize: $\Delta(\Theta(t))-V \cdot E\{r(t,f)|\Theta(t)\};$ and determining a forwarding port f minimizing a value of the above formula as the forwarding port corresponding to the first request content; wherein, E denotes averaging, r(t,f) denotes the reward function, and V denotes a positive parameter for adjusting a weight between r(t,f) and $L(\Theta(t))$.

3. A non-transitory computer storage medium storing at least one computer executable instruction, which when executed by a processor, causes the processor to carry out a method for determining a forwarding port in Named Data Networking, comprising:

determining an interest table item corresponding to a first request content in a pending interest table, wherein the interest table item is configured to store port information of a received interest packet corresponding to the first request content;

creating a request queue corresponding to the first request content according to the port information stored in the interest table item;

determining a maximum round-trip time (RTT) corresponding to an importance of the first request content, the maximum round-trip time (RTT) corresponding to the first request content being preset for the first request content, and constructing a reward function according to the maximum RTT;

constructing an optimization problem according to the reward function, the request queue and the maximum RTT; and performing a calculation on the optimization problem according to a Lyapunov function to obtain a Lyapunov drift, and determining a forwarding port corresponding to the first request content according to the Lyapunov drift;

wherein constructing a reward function according to the maximum RTT comprises:

constructing the reward function according to the maximum RTT and based on the following formula:

$$r_c(t,f)=\beta_c(RTT_{c,max}-rtt_c(t,f));$$

where $RTT_{c,max}$ denotes the maximum RTT corresponding to the first request content, $rtt_c(t,f)$ denotes an average RTT corresponding to the first request content within a period of t, and $\beta_c$ denotes a weight factor preset for the first request content; and wherein constructing an optimization problem according to the reward function, the request queue and the maximum RTT comprises:
constructing an optimization problem with a target of maximizing a value of the reward function and a constraint of the request queue and the maximum RTT according to the following formula:

Maximize: $\bar{r}$

Subject to: 1) $Q \leq ITEM_{max}$

2) $\overline{Timer_c} \leq RTT_{c,max} (\forall_c=1,2,\ldots,C)$

3) $\overline{cap_f} \leq CAP_{max} (\forall f=1,2,\ldots,F)$

4) $f(t) \in \{1,2,\ldots,F\}$ where Maximize: $\bar{r}$ denotes the target of maximizing the value of the reward function, $\overline{Q}$ denotes a length of the request queue, $ITEM_{max}$ denotes a maximum allowable length of the request queue, then $\overline{Q} \leq ITEM_{max}$ denotes a constraint that the length of the request queue does not exceed the maximum allowable length of the request queue;
$\overline{Timer_c}$ denotes the average RTT, $RTT_{c,max}$ denotes the maximum RTT corresponding to the first request content, then $\overline{Timer_c} \leq RTT_{c,max}(\forall c=1, 2, \ldots, C)$ denotes a constraint that the average RTT does not exceed the maximum RTT; C denotes a total amount of contents arrived;
$\overline{cap_f}$ denotes a link capacity, $CAP_{max}(\forall f=1, 2, \ldots, F)$ denotes a maximum link capacity, then $\overline{cap_f} \leq CAP_{max}$ ($\forall f=1, 2, \ldots F$) denotes a constraint that the link capacity does not exceed the maximum link capacity;
f(t) denotes forwarding ports to be selected and $f(t) \in \{1, 2\ldots, F\}$ denotes a range of the forwarding port to be selected; F denotes a total amount of ports.

4. A method for determining a forwarding port in Named Data Networking, comprising:
determining an interest table item corresponding to a first request content in a pending interest table, wherein the interest table item is configured to store port information of a received interest packet corresponding to the first request content;
creating a request queue corresponding to the first request content according to the port information stored in the interest table item;
determining a maximum round-trip time (RTT) corresponding to the first request content, the maximum round-trip time (RTT) corresponding to the first request content being preset for the first request content, and constructing a reward function according to the maximum RTT;
constructing an optimization problem according to the reward function, the request queue and the maximum RTT; and
performing a calculation on the optimization problem according to a Lyapunov function to obtain a Lyapunov drift, and determining a forwarding port corresponding to the first request content according to the Lyapunov drift;
wherein constructing a reward function according to the maximum RTT comprises:
constructing the reward function according to the maximum RTT and based on the following formula:

$r_c(t,f) = \beta_c(RTT_{c,max} - rtt_c(t,f))$;

where $RTT_{c,max}$ denotes the maximum RTT corresponding to the first request content,
$rtt_c(t,f)$ denotes an average RTT corresponding to the first request content within a period of t, and
$\beta_c$ denotes a weight factor preset for the first request content; and
wherein constructing an optimization problem according to the reward function, the request queue and the maximum RTT comprises:
constructing an optimization problem with a target of maximizing a value of the reward function and a constraint of the request queue and the maximum RTT according to the following formula:

Maximize: $\bar{r}$

Subject to: 1) $Q \leq ITEM_{max}$

2) $\overline{Timer_c} \leq RTT_{c,max} (\forall_c=1,2,\ldots,C)$

3) $\overline{cap_f} \leq CAP_{max} (\forall f=1,2,\ldots,F)$

4) $f(t) \in \{1,2,\ldots,F\}$ where Maximize: $\bar{r}$ denotes the target of maximizing the value of the reward function, $\overline{Q}$ denotes a length of the request queue, $ITEM_{max}$ denotes a maximum allowable length of the request queue, then $\overline{Q} \leq ITEM_{max}$ denotes a constraint that the length of the request queue does not exceed the maximum allowable length of the request queue;
$\overline{Timer_c}$ denotes the average RTT, $RTT_{c,max}$ denotes the maximum RTT corresponding to the first request content, then $\overline{Timer_c} \leq RTT_{c,max}(\forall c=1, 2, \ldots, C)$ denotes a constraint that the average RTT does not exceed the maximum RTT; C denotes a total amount of contents arrived;
$\overline{cap_f}$ denotes a link capacity, $CAP_{max}(\forall f=1, 2, \ldots, F)$ denotes a maximum link capacity, then $\overline{cap_f} \leq CAP_{max}$ ($\forall f=1, 2, \ldots F$) denotes a constraint that the link capacity does not exceed the maximum link capacity;
f(t) denotes forwarding ports to be selected and $f(t) \in \{1, 2\ldots, F\}$ denotes a range of the forwarding port to be selected; F denotes a total amount of ports.

* * * * *